US011274524B2

(12) United States Patent
Beeton

(10) Patent No.: US 11,274,524 B2
(45) Date of Patent: Mar. 15, 2022

(54) ELONGATED FLOW STOPPER IN STANDING VALVE OF BOTTOM HOLE SPRING ASSEMBLY FOR FACILITATING PRODUCTION OF HYDROCARBONS

(71) Applicant: QSO Inc., Red Deer (CA)

(72) Inventor: Ryan Beeton, Three Hills (CA)

(73) Assignee: QSO Inc., Red Deer (CA)

( * ) Notice: Subject to any disclaimer, the term of this patent is extended or adjusted under 35 U.S.C. 154(b) by 239 days.

(21) Appl. No.: 16/776,798

(22) Filed: Jan. 30, 2020

(65) Prior Publication Data

US 2020/0165902 A1  May 28, 2020

(30) Foreign Application Priority Data

May 6, 2019 (CA) ...................... 3042319

(51) Int. Cl.
  *E21B 34/14* (2006.01)
  *F16K 1/36* (2006.01)
  *F16K 3/316* (2006.01)

(52) U.S. Cl.
  CPC ................ *E21B 34/14* (2013.01); *F16K 1/36* (2013.01); *F16K 3/3165* (2013.01); *E21B 2200/04* (2020.05)

(58) Field of Classification Search
  CPC .... E21B 34/14; E21B 34/142; E21B 2200/04; F16K 1/36; F16K 3/3165
  See application file for complete search history.

(56) References Cited

U.S. PATENT DOCUMENTS

| 8,978,773 B2* | 3/2015 | Tilley | E21B 23/04 166/351 |
|---|---|---|---|
| 2015/0191988 A1* | 7/2015 | Kiesel | E21B 34/14 166/373 |

OTHER PUBLICATIONS

CIPO, Office action dated Apr. 7, 2020 in counterpart Canadian patent application No. 3,042,319.
CIPO, "Commissioner's Notice—Application Found Allowable" dated May 28, 2020 in counterpart Canadian patent application No. 3,042,319.

* cited by examiner

*Primary Examiner* — Matthew R Buck
(74) *Attorney, Agent, or Firm* — ATMAC Patent Services Ltd.; Andrew T. MacMillan

(57) ABSTRACT

A flow stopper for a standing valve within a bottom hole spring assembly for facilitating production of hydrocarbons has an elongated shape. The elongated shape has a concave section such that the flow stopper can impact a line running along an inner surface of the housing in a lengthwise direction of the tubular cavity. The concave section allows the flow stopper to impact the housing with a first point of contact and a second point of contact on the line, and the two points of contact are separated by a gap where the flow stopper does not contact the housing. The flow stopper may include a first and a second ball where the balls are connected by a stem. The flow stopper may also include a plurality of balls that are not connected to each other. The flow stopper may include a ball connected to a stem.

20 Claims, 23 Drawing Sheets

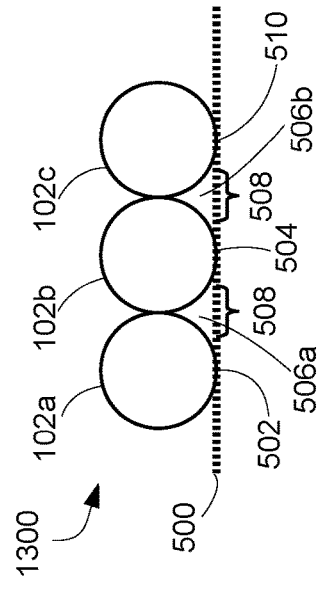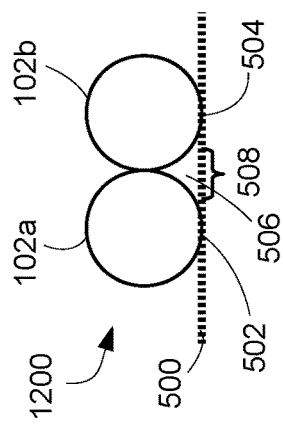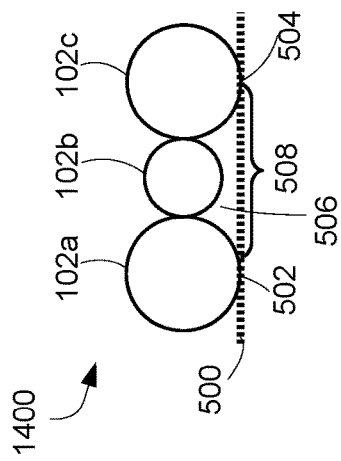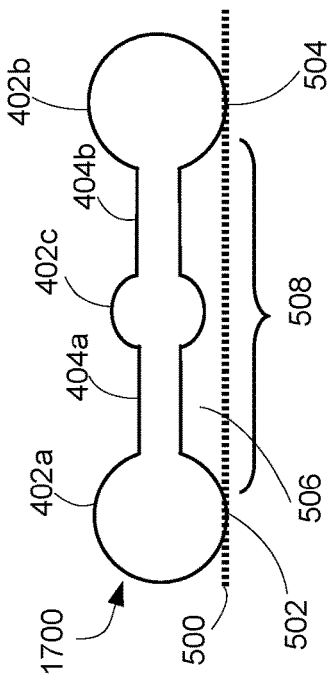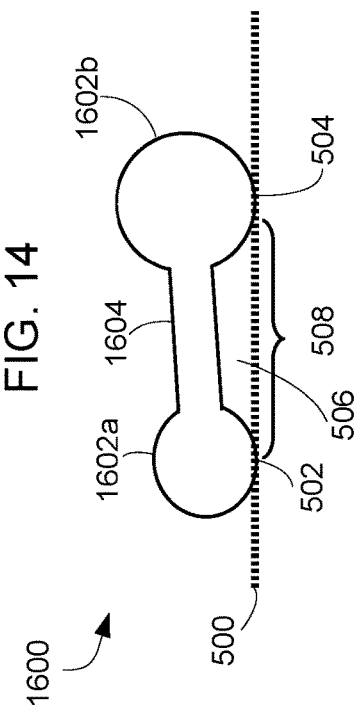

US 11,274,524 B2

ELONGATED FLOW STOPPER IN STANDING VALVE OF BOTTOM HOLE SPRING ASSEMBLY FOR FACILITATING PRODUCTION OF HYDROCARBONS

CROSS-REFERENCE TO RELATED APPLICATIONS

This application claims the benefit of priority of Canadian Application No. 3,042,319 filed May 6, 2019, which is incorporated herein by reference.

BACKGROUND OF THE INVENTION

(1) Field of the Invention

The invention pertains generally to a flow stopper in a standing valve within a bottom hole spring assembly for facilitating production of hydrocarbons from a subterranean well. More specifically, the invention pertains to an elongated flow stopper providing a better seal when the standing valve is positioned deeper in the heel of a horizontal well in comparison to a conventional check ball design.

(2) Description of the Related Art

Bottom hole spring assemblies are commonly used in wellbore tubing of vertical and horizontal subterranean wells. The bottom hole spring assembly is used to absorb the shock of a falling plunger. The spring assembly protects the plunger as well as the downhole tubing equipment from damage that may result from the free-falling plunger when there is not enough fluid in the wellbore tubing for dampening. The plunger is part of a plunger lift system used to remove accumulated liquids above the bottom hole spring assembly within the wellbore tubing to thereby restore and/or facilitate gas flow. Conventional bottom hole spring assemblies include a standing valve (also known as a check valve) comprising a check ball that works in conjunction with a seat to allow fluid to rise up though the value above the spring assembly but to trap the fluid and prevent the fluid passage back into the section of the well below the spring assembly.

Although conventional check valves work well in vertical wells, they do not maintain an effective seal when positioned too deep in the heel section of a horizontal well. As the placement depth of the spring assembly is increased in the heel section, the angle of the check valve becomes more and more horizontal and at a certain point the check ball fails to seal properly against the seat. In order to keep the orientation of the check valve closer to vertical and allow an effective seal of ball against seat, the bottom hole spring assembly needs to be positioned closer to the surface in the heel section. Moving the spring assembly closer to the surface reduces the amount of liquid that can be trapped above the spring assembly. Each plunger cycle thus lifts less fluid from the well than would be achieved if the spring assembly were located at a greater depth. Furthermore, the liquid that remains below the spring assembly and is not removed by the plunger hinders hydrocarbon flow to surface.

BRIEF SUMMARY OF THE INVENTION

According to an exemplary embodiment of the invention there is disclosed a flow stopper for a standing valve within a bottom hole spring assembly for facilitating production of hydrocarbons from a subterranean well. The bottom hole spring assembly includes a tubular cavity within a housing. The standing valve prevents backflow of a fluid column to allow a surface controlled plunger system to remove the fluid column. The housing has a plurality of ports providing fluid access to the tubular cavity. The flow stopper is moveable between a first position and a second position within the tubular cavity. The flow stopper in the first position is adjacent to a seat of a bottom port of the ports thereby obstructing fluid flow through the bottom port. The flow stopper in the second position is away from the seat of the bottom port thereby allowing fluid to flow through the bottom port. The flow stopper has an elongated shape, and the elongated shape has a concave section such that the flow stopper can impact a line running along an inner surface of the housing in a lengthwise direction of the tubular cavity. The concave section allows the flow stopper to impact the housing with a first point of contact and a second point of contact on the line, and the concave section ensures that the first point of contact and the second point of contact are separated by a gap where the flow stopper does not contact the inner surface of the housing on the line.

According to an exemplary embodiment of the invention there is disclosed a bottom hole spring assembly for facilitating production of hydrocarbons from a subterranean well. The bottom hole spring assembly includes a housing having a plurality of ports providing fluid access to a tubular cavity within the housing. A standing valve has a seat and a flow stopper, and the standing valve prevents backflow of a fluid column to allow a surface controlled plunger system to remove the fluid column. The flow stopper is moveable between a first position and a second position within the tubular cavity. The flow stopper in the first position is adjacent to the seat of a bottom port of the ports thereby obstructing fluid flow through the bottom port. The flow stopper in the second position is away from the seat of the bottom port thereby allowing fluid to flow through the bottom port. The flow stopper has an elongated shape, and the elongated shape has a concave section such that the flow stopper can impact a line running along an inner surface of the housing in a lengthwise direction of the tubular cavity. The concave section allows the flow stopper to impact the housing with a first point of contact and a second point of contact on the line. The concave section ensures that the first point of contact and the second point of contact are separated by a gap where the flow stopper does not contact the inner surface of the housing on the line.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 12 shows a sideview of a flow stopper having two balls not mechanically connected to each other according to an exemplary embodiment.

FIG. 13 shows a sideview of a flow stopper having three balls not mechanically connected to each other according to an exemplary embodiment.

FIG. 14 shows a sideview of a flow stopper having three balls mechanically connected to each other according to an exemplary embodiment.

FIG. 15 shows a sideview of a flow stopper having a ball connected a stem according to an exemplary embodiment.

FIG. 16 shows a sideview of a flow stopper having two different sized balls connected by a stem according to an exemplary embodiment.

FIG. 17 shows a sideview of a flow stopper having the flow stopper of FIG. 4 with an additional ball connected to a middle portion of the stem according to an exemplary embodiment.

DETAILED DESCRIPTION

Figure 1:
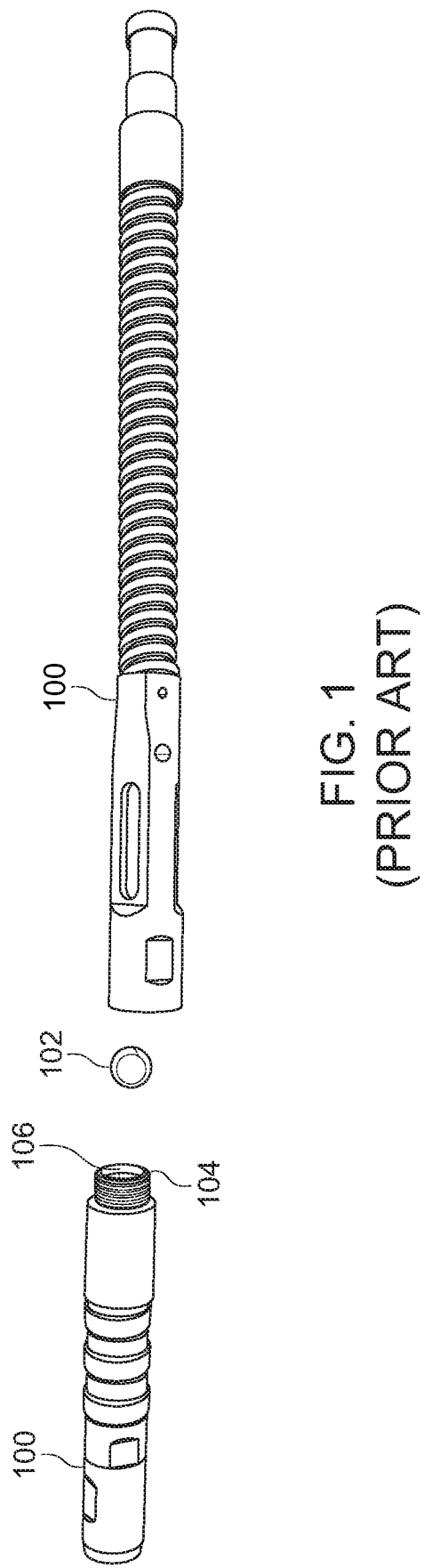
FIG. 1 shows an exploded view of a bottom hole spring assembly having a conventional check ball according to the prior art.
Figure 2:
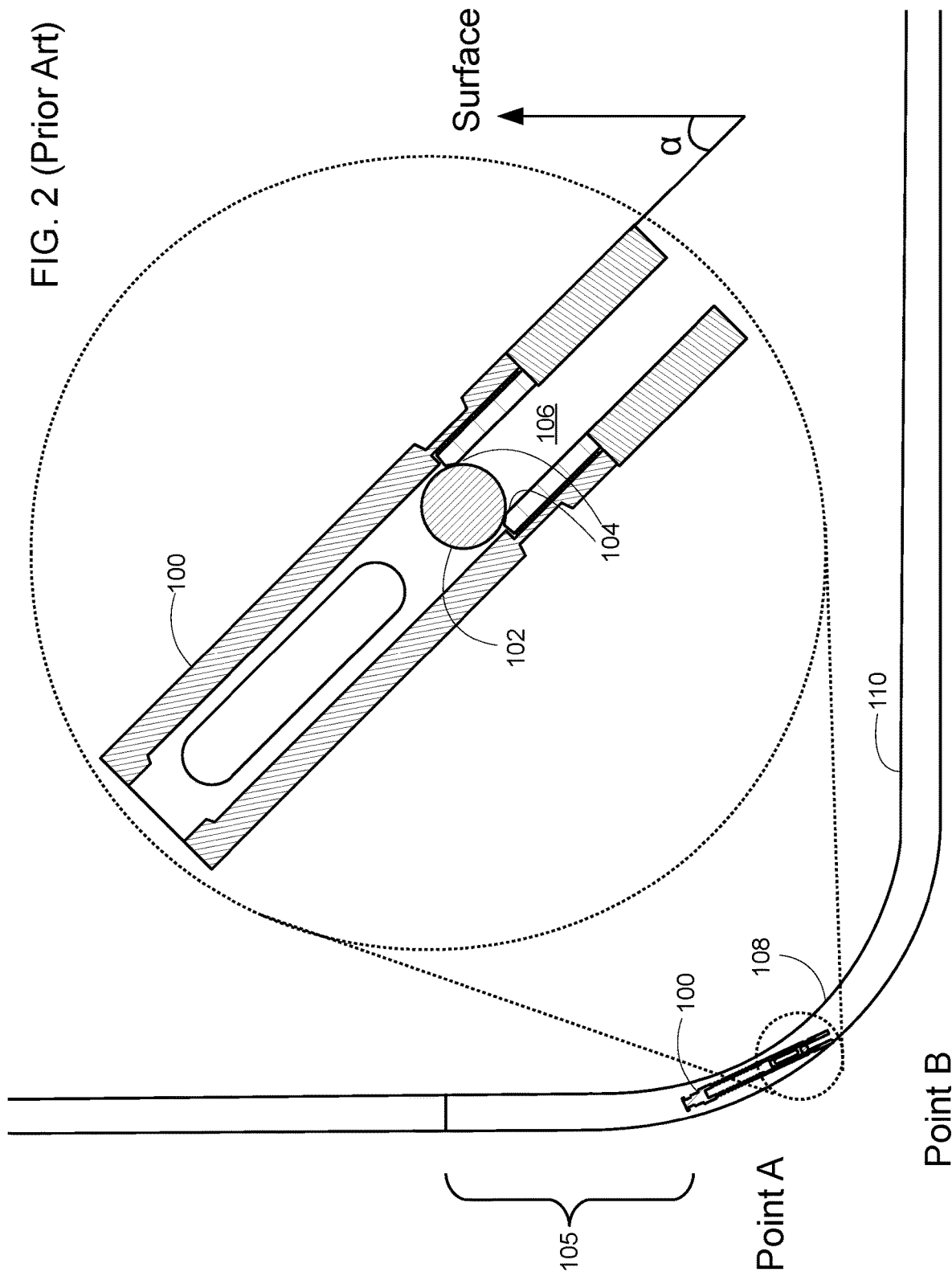
FIG. 2 shows a schematic of the bottom hole spring assembly of FIG. 1 placed within the heel section of a horizontal well at a first depth where the check ball can seal properly.
Figure 3:
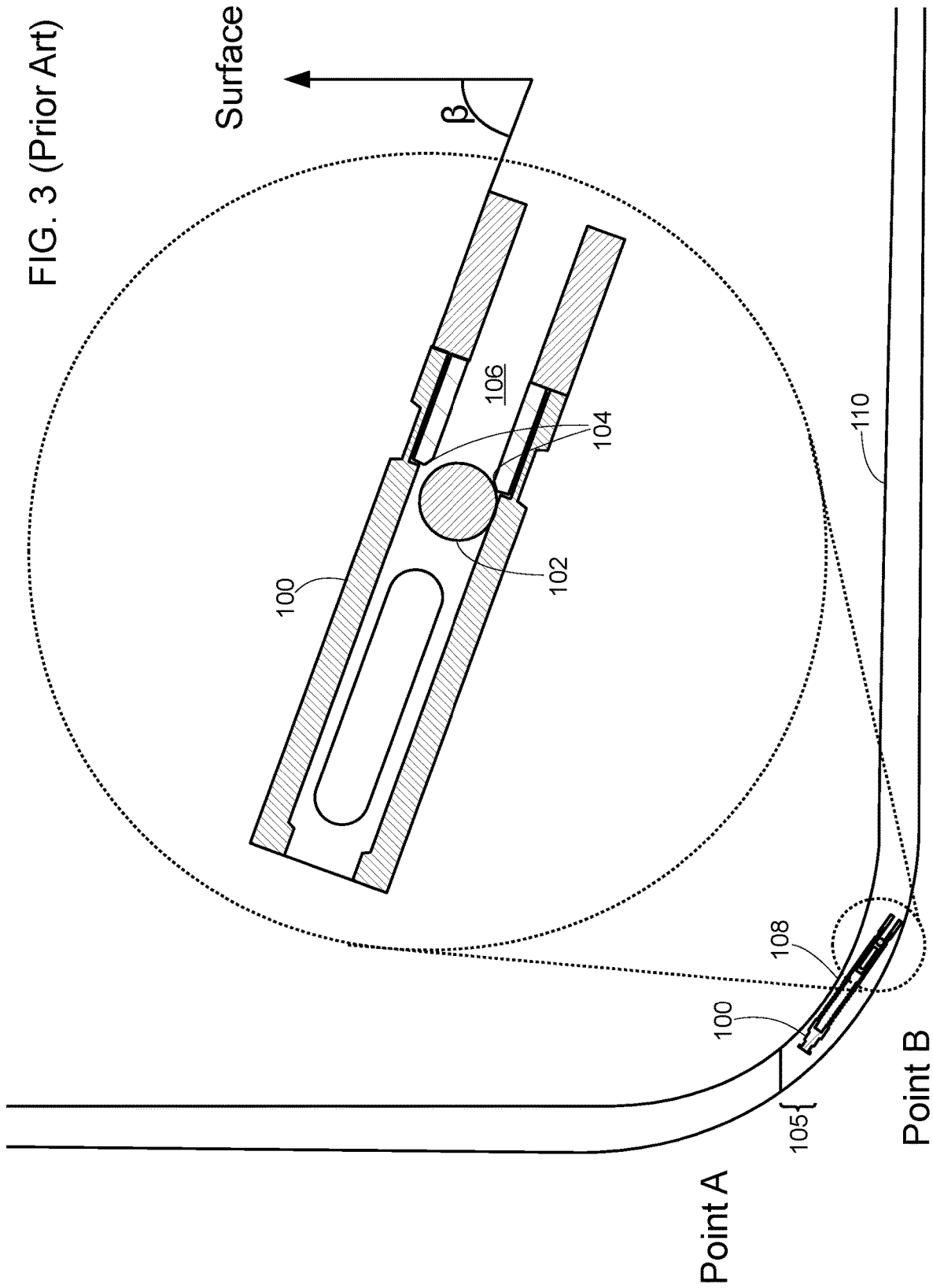
FIG. 3 shows a schematic of the bottom hole spring assembly of FIG. 1 placed within the heel of the horizontal well at a second point which is deeper than the first point of FIG. 2 and prevents the check ball from sealing properly.

FIG. 1, FIG. 2, and FIG. 3 provide an overview of conventional standing valves used within a bottom hole spring assembly 100 in order to better describe existing limitations. FIG. 1 shows an exploded view of a bottom hole spring assembly 100 having a conventional check ball 102 according to the prior art. The bottom hole spring assembly 100 includes a conventional standing valve having the conventional check ball 102 working in conjunction with a seat 104 to trap fluid 105 above the spring assembly 100. The standing valve is designed to prevent fluid passage back through a bottom port 106 of the bottom hole spring assembly 100 and into the formation.

The conventional valve provides an adequate seal in vertical wells where the bottom hole assembly 100 is oriented vertically within the wellbore tubing; however, the use of conventional standing valves is limited within horizontal well. As the bottom hole assembly 100 is placed deeper within the wellbore tubing of a horizontal well, the bottom hole spring assembly 100 approaches a horizontal orientation.

FIG. 2 shows a schematic of the bottom hole spring assembly 100 of FIG. 1 placed within the heel section 108 of a horizontal well 110 at a first depth (point A) where the check ball 102 can seal properly according to the prior art. In this example, at point A the bottom hole spring assembly 100 angle α is 45 degrees, where zero degrees corresponds to a vertical vector pointing directly upwards to the surface. The conventional standing valve check ball 102 used with the bottom hole spring assembly 100 may be able to maintain a seal against the seat 104 when an angle α of the bottom hole spring assembly 100 is less than 48 degrees such as illustrated in FIG. 2. However, it would be advantageous to place the bottom hole spring assembly 100 even deeper into the horizontal well 110 as it would allow more fluid 105 to be captured per plunger cycle.

FIG. 3 shows a schematic of the bottom hole spring assembly 100 of FIG. 1 placed within the heel 108 of the horizontal well 110 at a second point (point B) which is deeper than the first point of FIG. 2 and prevents the check ball 102 from sealing properly. In this example, at point B the bottom hole spring assembly 100 angle β is 65 degrees. When the bottom hole spring assembly 100 is placed at point B, the angle β of the bottom hole spring assembly 100 is greater than a limit angle (e.g., 48 degrees) at which the spring assembly 100 prevents fluid backflow. When the bottom hole spring assembly 100 is placed at angles higher than the limit angle such as illustrated in FIG. 3, the ball 102 is unable to maintain the seal with the seat 104 as the ball 102 rolls out of the seat 104. As a result, the fluid flows back into the formation via the seat port 106 drastically reducing a height of the fluid column 105 which can be removed per plunger cycle. The backflow of fluid 105 into the formation also impedes the flow of hydrocarbons to the surface. In short, the conventional standing valve design limits the depth at which the standing valve can maintain the seal.

Figure 4:
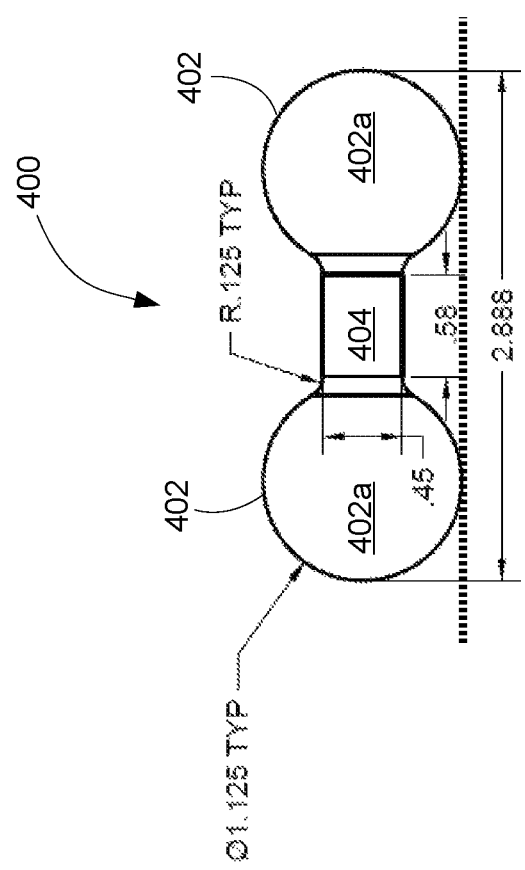
FIG. 4 shows a sideview of a flow stopper having two similar size balls connected by a stem according to an exemplary embodiment.

FIG. 4 shows a sideview of a flow stopper 400 having two similar size balls 402 connected by a stem 404 according to an exemplary embodiment. In this embodiment, the flow stopper 400 includes a first ball 402a and a second ball 402b which are connected by a stem 404. The ball 402 shapes of this embodiment are advantageous to increase the length of the flow stopper 400 while minimizing contact area with the internal cavity of the check valve housing (also known as the check valve cage). Additionally, they are likely to have uniform wear and tear when the flow stopper 400 is exposed to the abrasives.

In this embodiment, the stem 404 of the flow stopper 400 has a cylindrical shape which has a diameter less than the diameter of the balls 402. The diameter of the stem 404 is designed to be less than the diameter of the balls 402 to ensure the stem 404 does not contact the internal cavity housing of the bottom hole spring assembly 600 while the flow stopper 400 moves within. The first ball 402 and the second ball 402 have diameters greater than a width of slots that act as ports providing fluid access to the tubular cavity in the hollow housing of the bottom hole spring assembly 100 (i.e., check valve cage), which ensures the flow stopper 400 stays within the housing.

Figure 5:
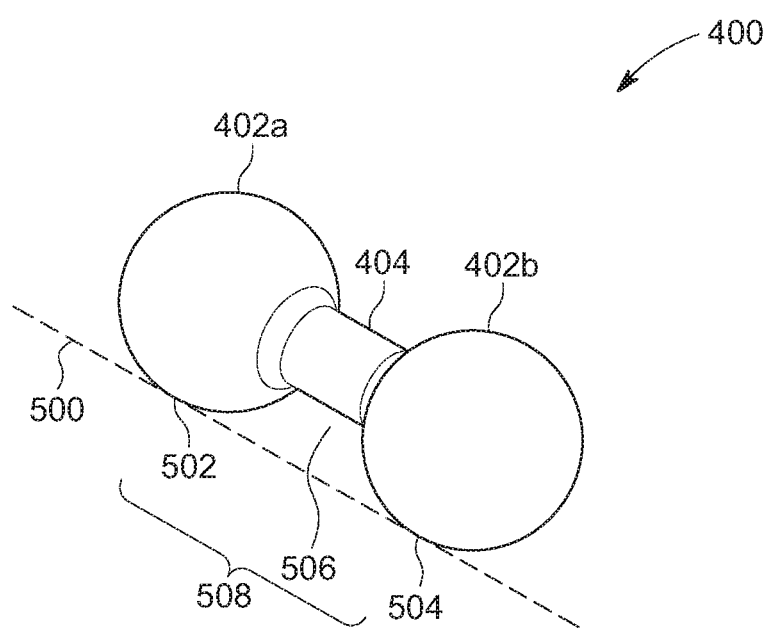
FIG. 5 shows a perspective view of the flow stopper of FIG. 4.

FIG. 5 shows a perspective view of the flow stopper 400 of FIG. 4. As shown in FIG. 4 and FIG. 5, when the flow stopper 400 is placed against a straight line 500, the flow stopper 400 has at least two points of contact 502, 504 with the line 500, and the two points 502, 504 of contact are separated by a gap 506 formed by a concave section 508 where the balls 402 curve inward to meet the stem 404.

Figure 6:
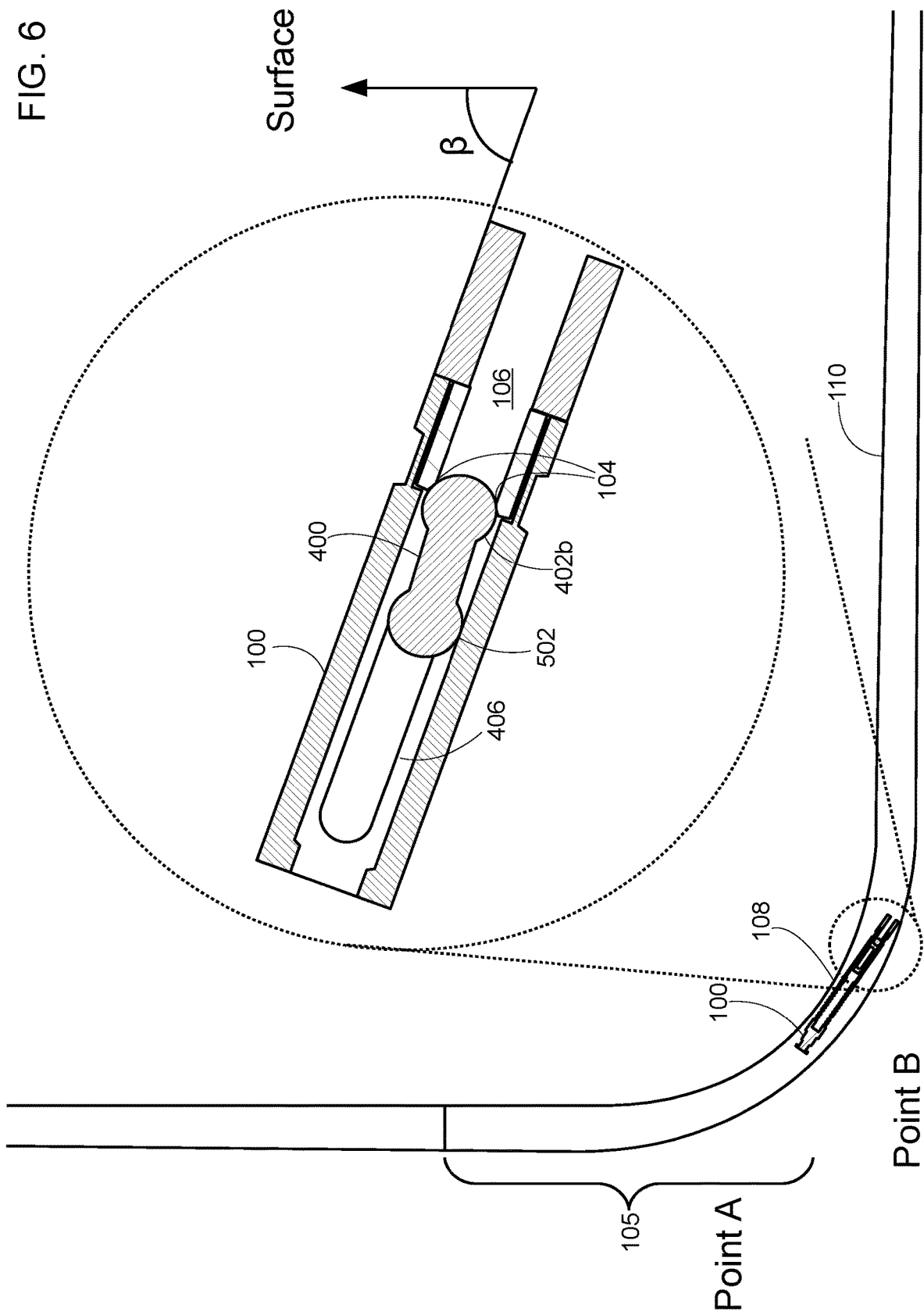
FIG. 6 shows a schematic of the bottom hole spring assembly within the heel of a horizontal well at a second point (similar depth as the second point of FIG. 3) having the flow stopper of FIG. 4 in a first position sealed against the seat according to an exemplary embodiment.
Figure 7:
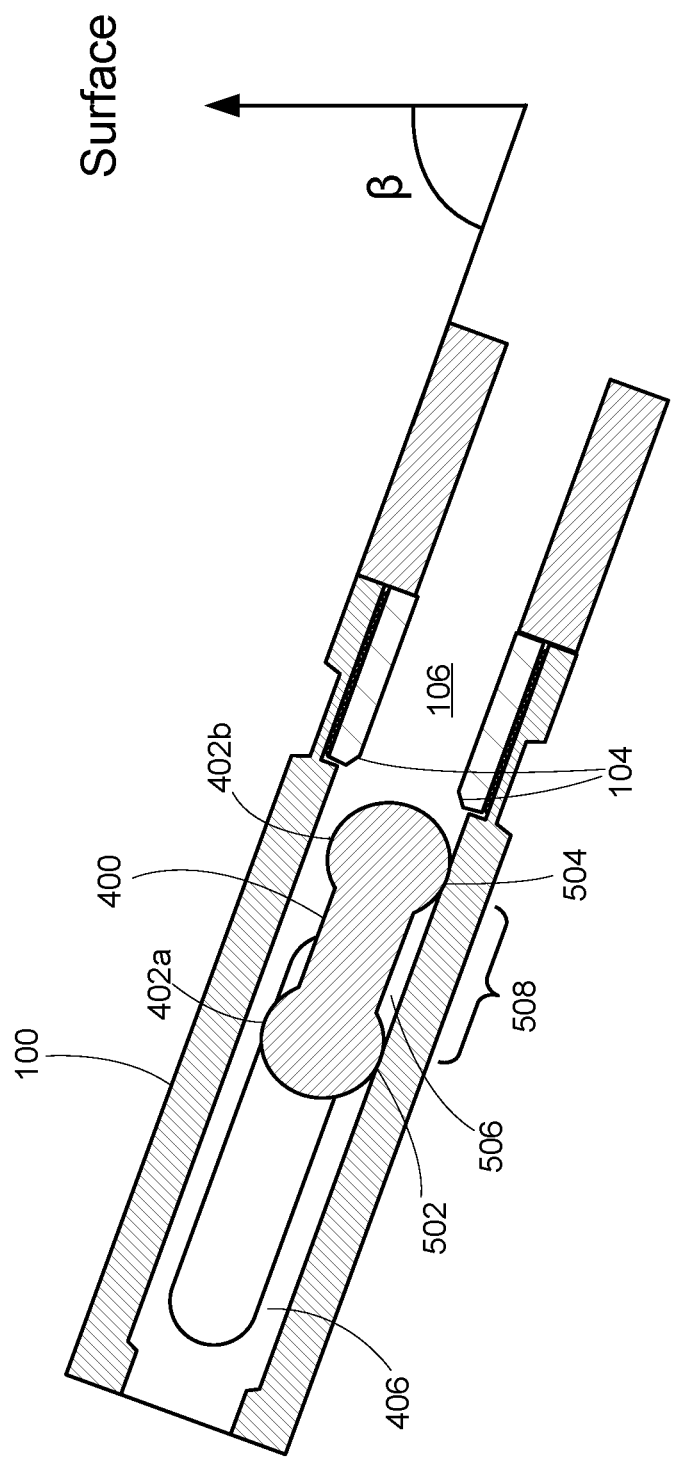
FIG. 7 shows a schematic of the bottom hole spring assembly within the heel of a horizontal well at a second point (similar depth as the second point of FIG. 3) having the flow stopper of FIG. 4 in a second position away from the seat according to an exemplary embodiment.

FIG. 6 shows a schematic of the bottom hole spring assembly 100 within the heel 108 of a horizontal well 110 at point B (similar depth as the second point—point B—of FIG. 3) having the flow stopper 400 of FIG. 4 in a first position where the stopper 400 is sealed against the seat 104 according to an exemplary embodiment. The flow stopper 400 is moveable between the first (sealed) position shown in FIG. 6 and a second (unsealed) position shown in FIG. 7 within the tubular cavity 406 formed within the housing of the bottom hole spring assembly 100 (i.e., within the check valve cage). The flow stopper 400 in the first position as shown in FIG. 6 is adjacent to the seat 104 of a bottom port 106 thereby restricting fluid 105 flow through the bottom port 106. The flow stopper 400 in the second position shown in FIG. 7 is away from the seat 104 of the bottom port 106 thereby allowing fluid 105 to flow through the bottom port and into the housing.

The barbell-shaped flow stopper 400 provides the seal in the first position at greater angles compared to the conventional ball 102 valve due to its longer length and higher mass. The second ball 102b contacts the seat rim 104 in the first position to maintain the seal around the seat rim 104 and prevents the flow stopper 400 from sliding, rolling or otherwise moving out of the seat 104.

By enabling a good stopper seal at higher angles β, the flow stopper 400 of this embodiment enables placing the bottom hole spring assembly 100 deeper into the wellbore tubing. Additional fluid 105 may beneficially be removed per plunger cycle in comparison to placing the spring assembly 100 at point A closer to the surface; the extra fluid 150 removed is between points A and B. In some embodiments, the barbell shape of the flow stopper 400 makes it possible to hold fluid 150 in wellbore tubing of angles β upwards of 76 degrees compared to the 48 degrees achieved with the conventional ball 102 valve.

Beneficially, the prior art circular check ball 102 can easily be replaced with the barbell-shaped flow stopper 400 of FIG. 4 without modifying anything else of the bottom hole spring assembly 100. The concave section of the flow stopper 400 helps ensure that there is a point of contact 502 along the housing wall above the seat 104 to hold the lower ball 102b against the seat 104 while ensuring the flow stopper 400 is not jammed in a fixed position within the cavity.

FIG. 7 shows a schematic of the bottom hole spring assembly 100 within the heel 108 of a horizontal well 110 at a second point (similar depth as the point B of FIG. 3) having the flow stopper 400 of FIG. 4 in a second position where it is away from the seat 104 according to an exemplary embodiment.

When the flow stopper 400 is dislodged from the seat 104, the momentum from additional mass allows the flow stopper 400 to fall into the seat 104 at a greater angle compared to the conventional check ball 102 after the fluid flow through the bottom port 106 has stopped.

As illustrated, the flow stopper 400 has an elongated shape, and the elongated shape has a concave section 508 such that the flow stopper 400 can impact a line running along an inner surface of the housing in a lengthwise direction of the tubular cavity 406. The concave section 508 allows the flow stopper 400 to impact the housing with a first point of contact 502 and a second point of contact 504 on the line, the concave section 508 ensures that the first point of contact 502 and the second point of contact 504 are separated by a gap 506 where the flow stopper 400 does not contact the inner surface of the housing on the line. The concave section 508 is formed between the two balls 102a, 102b in this embodiment.

Tolerances between the flow stopper 400 and the tubular cavity 406 of the housing may be adjusted to be close but not snug as the bottom hole spring assembly 100 is often exposed to sand and other debris which may hinder the flow stopper 400 movement within the cavity 406. By having adequate tolerances, the flow stopper 400 may move freely within the housing to allow or restrict flow depending on its position. The two points of contact 502, 504 of each ball 402 of the barbell shape help reduce the friction and allow for movement between the sealed and unsealed positions.

Figure 8:
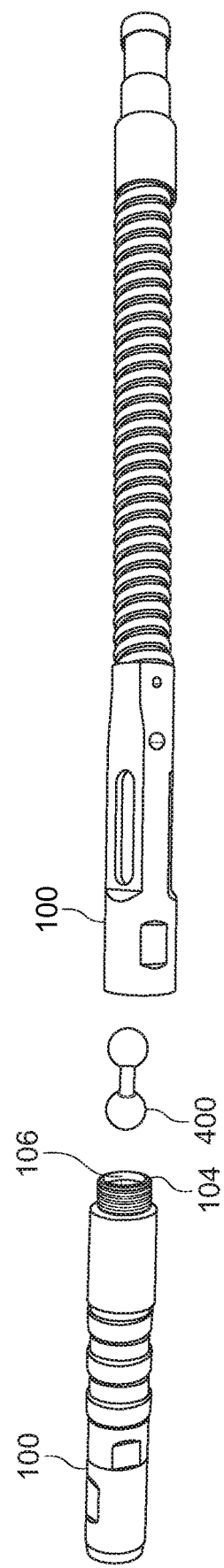
FIG. 8 shows an exploded view of the bottom hole spring assembly with the flow stopper of FIG. 4 according an exemplary embodiment.

FIG. 8 shows an exploded view of the bottom hole spring assembly 100 with the flow stopper 400 of FIG. 4 according an exemplary embodiment.

Figure 9:
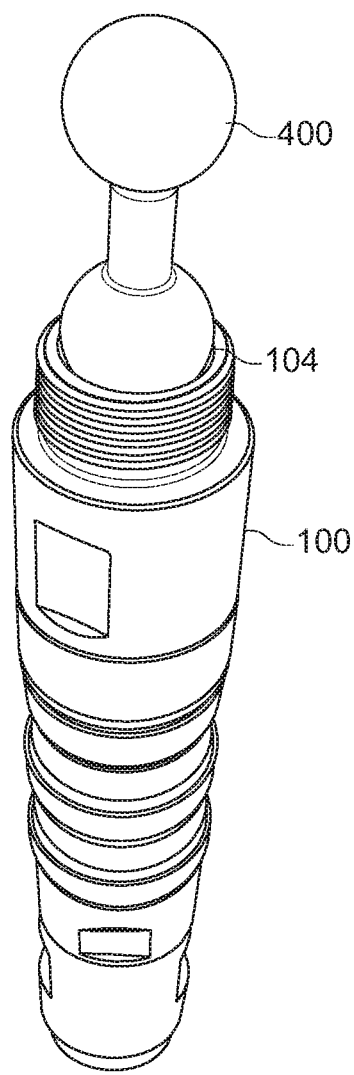
FIG. 9 shows the flow stopper of FIG. 4 in the first position sealed against the seat to restrict fluid flow according to an exemplary embodiment.

FIG. 9 shows the flow stopper 400 of FIG. 4 in the first position sealed against the seat 104 to restrict fluid flow according to an exemplary embodiment.

Figure 10:
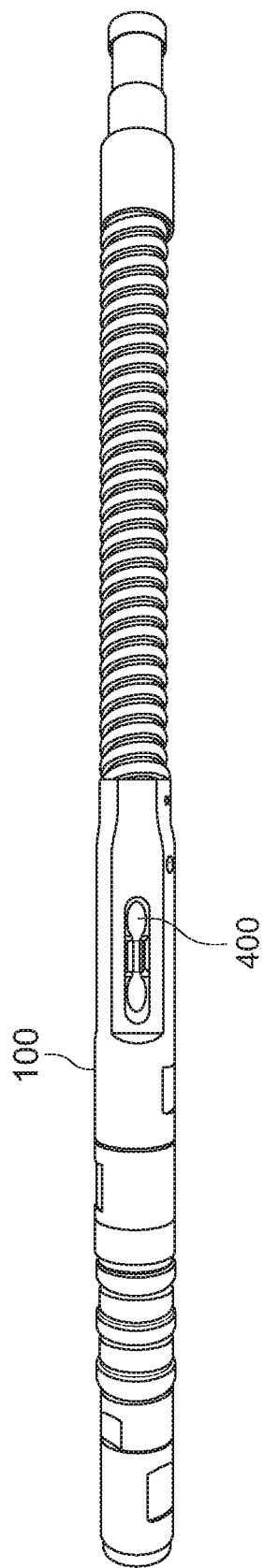
FIG. 10 shows the flow stopper of FIG. 4 in a second position away from the seat to allow fluid to flow through a bottom port according to an exemplary embodiment.

FIG. 10 shows the flow stopper 400 of FIG. 4 in a second position away from the seat 104 to allow fluid 150 to flow through a bottom port 106 according to an exemplary embodiment.

Figure 11:
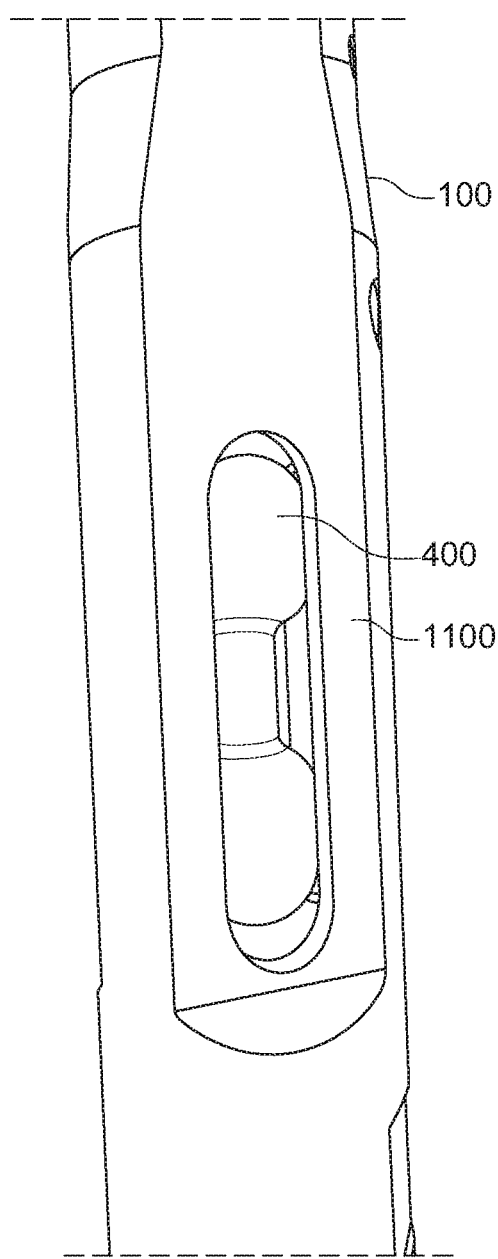
FIG. 11 shows the flow stopper of FIG. 4 within the housing of the bottom hole spring assembly according to an exemplary embodiment.

FIG. 11 shows the flow stopper of FIG. 4 within the housing 1100 of the bottom hole spring assembly 100 according to an exemplary embodiment.

FIG. 12 shows a sideview of a flow stopper 1200 having two balls 102a, 102b according to an exemplary embodiment. In this embodiment, the balls 102a, 102b are not mechanically connected to each other and are free to separately roll and move within the housing 1100. The first ball 102a makes a first point of contact 502 on the line 500 and the second ball 102b makes a second point of contact 504 on the line 500. When the balls 102a, 102b are physically touching which happens as a result of gravity pulling both balls 102a, 102b toward the seat 104, a concave section 508 is formed between the two points of contact 502, 504 along the housing line 500 which are separated by a gap 506. In this way, similar to the barbell shaped flow stopper 400, utilizing two check balls 102a, 102b instead of one can also achieve a similar elongated flow stopper shape with concave section C. Although the above example described the balls 102a, 102b being not mechanically connected, in another embodiment, they may be connected together and not independent parts.

FIG. 13 shows a sideview of a flow stopper 1300 having three balls 102a, 102b, 102c according to an exemplary embodiment. Again, the three balls 102a,b,c in this embodiment are not mechanically connected to each other and are free to roll within the housing 1100. The first ball 102a makes a first point 502 of contact on the line 500, the second ball 102b make a second point of contact 504 on the line 500, and the third ball 102c makes a third point of contact 510 on the line 500. When the three balls 102a,b,c are touching, the balls 102a,b,c form two gaps 506 between the three points of contact 502, 504, 510. The first gap 506a is formed between the first ball 102a and the second ball 102b, and the second gap 506b is formed between the second ball 102b and the third ball 102c. Each of the gaps 506 has a concave section 508 similar to as described above. Similar benefits are achieve as above because of the increased weight allowing a great angle while ensuring minimal friction of the flow stopper balls 102a,b,c within the housing 1100. Again, in another embodiment, the three balls 102a,b,c of the flow stopper 1300 may be attached to one another. Any number of balls 102, either attached or unattached may be utilized to form the flow stopper 1300 in other embodiments.

FIG. 14 shows a sideview of a flow stopper 1400 having three balls 102a, 102b, 102c mechanically connected to each other according to an exemplary embodiment. In this embodiment, three balls 102a,b,c are mechanically connected to each other so they together can slide within the housing between the first position and the second position. The first ball 102a and the third ball 102c have the same diameter, and a diameter of the second ball 102b is smaller than the first 102a and the third ball 102c diameter. The first ball 102a makes a first point of contact 502 on the line 500 and the third ball 102c makes a second point of contact 504 on the line 500. The two points of contact 502, 504 are separated by a gap 506 which forms a concave section 508.

FIG. 15 shows a sideview of a flow stopper 1500 having a ball 1502 connected to a stem 1504 according to an exemplary embodiment. The ball 1502 is connected to a first end of a cylindrical stem 1504, and the second end of the stem 1504 is rounded. The stem 1504 diameter and the first ball 1502 diameter are greater than a width of the slots within the housing 1100. The first ball 1502 makes a first point of contact 502 on the line 500 and the stem 1504 makes a second point of contact 504 on the line 500. A concave section 508 is formed between the two points of contact 502, 504 on the line 500. The first and the second point of contact 502, 504 are separated by a gap 506 where the flow stopper 1500 does not contact the housing 1100.

FIG. 16 shows a sideview of a flow stopper 1600 having two different sized balls 1602a, 1602b connected by a stem 1604 according to an exemplary embodiment. The first ball 1602a diameter and the second ball 1602b diameter are greater than a diameter of the stem 1604. The first ball 1602a makes a first point of contact 502 on the line 500 and a second ball 1602b makes a second point of contact 504 on the line 500. The first and the second points of contact 502, 504 are separated by a gap 506 formed by a concave section 508 where the flow stopper 1600 does not contact the housing 1100.

FIG. 17 shows a sideview of a flow stopper 1700 having the flow stopper 400 of FIG. 4 with an additional ball 402c connected to a middle portion of the stem 404 according to an exemplary embodiment. In this embodiment, the flow stopper 1700 has a longer length compared to the barbell flow stopper 400 illustrated in FIG. 4 and FIG. 16. The modified barbell 1700 comprises a first ball 402a, a second ball 402c, a third ball 402b, a first stem 404a, and a second stem 404a. The first ball 402a and the second ball 402c are connected by the first stem 404a, and the second ball 402c and the third ball 402b are connected by a second stem 404b. The first ball 402a makes a first point of contact 502 and the third ball 402b makes a second point of contact 504 on the line 500. A concave section 508 is formed between the first contact point 502 and the second contact point 504, and the two points of contact 502, 504 are separated by a space 506. The second ball 402c provides additional mass to the flow stopper 1700 without creating additional friction between the flow stopper 1700 and the housing 1100. In some embodiment, the first and the third balls 402a,b have different diameters, and the first and second stems 404a,b have different diameters.

Figure 18:
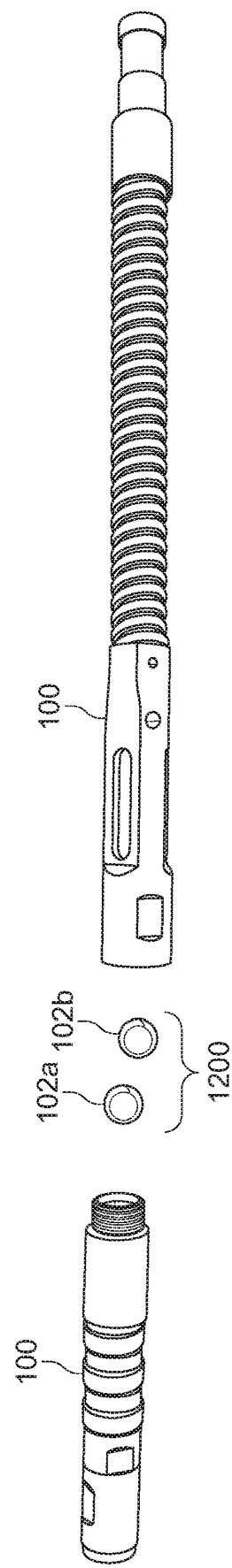
FIG. 18 shows an exploded view of the bottom hole spring assembly having the flow stopper of FIG. 12 according to an exemplary embodiment.

FIG. 18 shows an exploded view of the bottom hole spring assembly 100 having the flow stopper 1200 of FIG. 12 formed by two independent check balls 102a, 102b according to an exemplary embodiment. In some embodiments, the two balls 102a,b have different diameters. In some embodiments, the same check balls 102 as the prior-art can be utilized making for easy enhancement of a conventional check valve for use in a horizontal well by simply adding two check balls 102 instead one. There may beneficially be no need for additional manufacturing set-ups and, if a ball gets damaged, it can be easily replaced with existing supplies.

Figure 19:
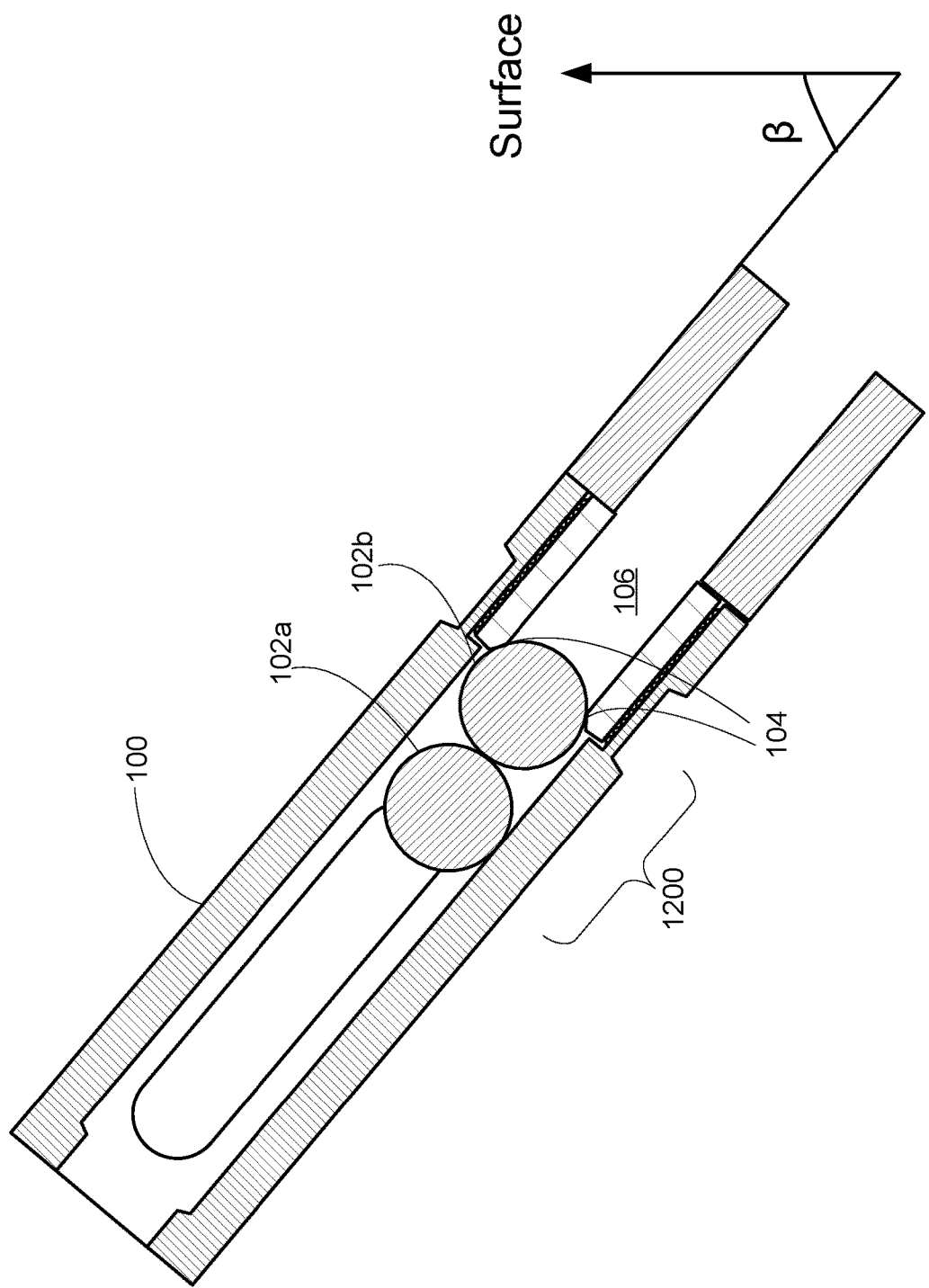
FIG. 19 shows a schematic of the bottom hole spring assembly having the flow stopper of FIG. 12 in the first position sealed against the seat to restrict fluid flow according an exemplary embodiment.

FIG. 19 shows a schematic of the bottom hole spring assembly 100 having the flow stopper 1200 of FIG. 12 in the first position sealed against the seat 104 to restrict fluid flow according an exemplary embodiment. In some embodiments, the additional mass and length of the two balls 102a,b allows the standing valve configured with two balls 102a,b to provide the seal up to a bottom hole spring assembly 100 angle β of approximately 57 degrees.

Figure 20:
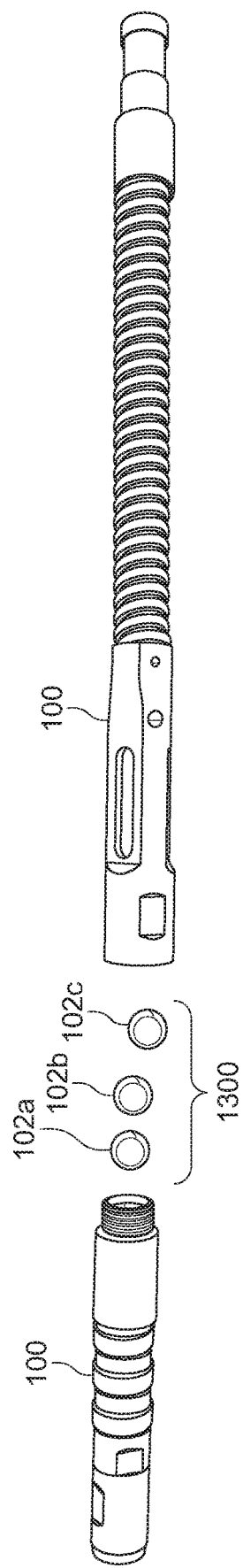
FIG. 20 shows an exploded view of the bottom hole spring assembly having the flow stopper of FIG. 13 according to an exemplary embodiment.

FIG. 20 shows an exploded view of the bottom hole spring assembly 100 having the flow stopper 1300 of FIG. 13 according to an exemplary embodiment. In some embodiments, the three balls 102a,b,c have different diameters.

Figure 21:
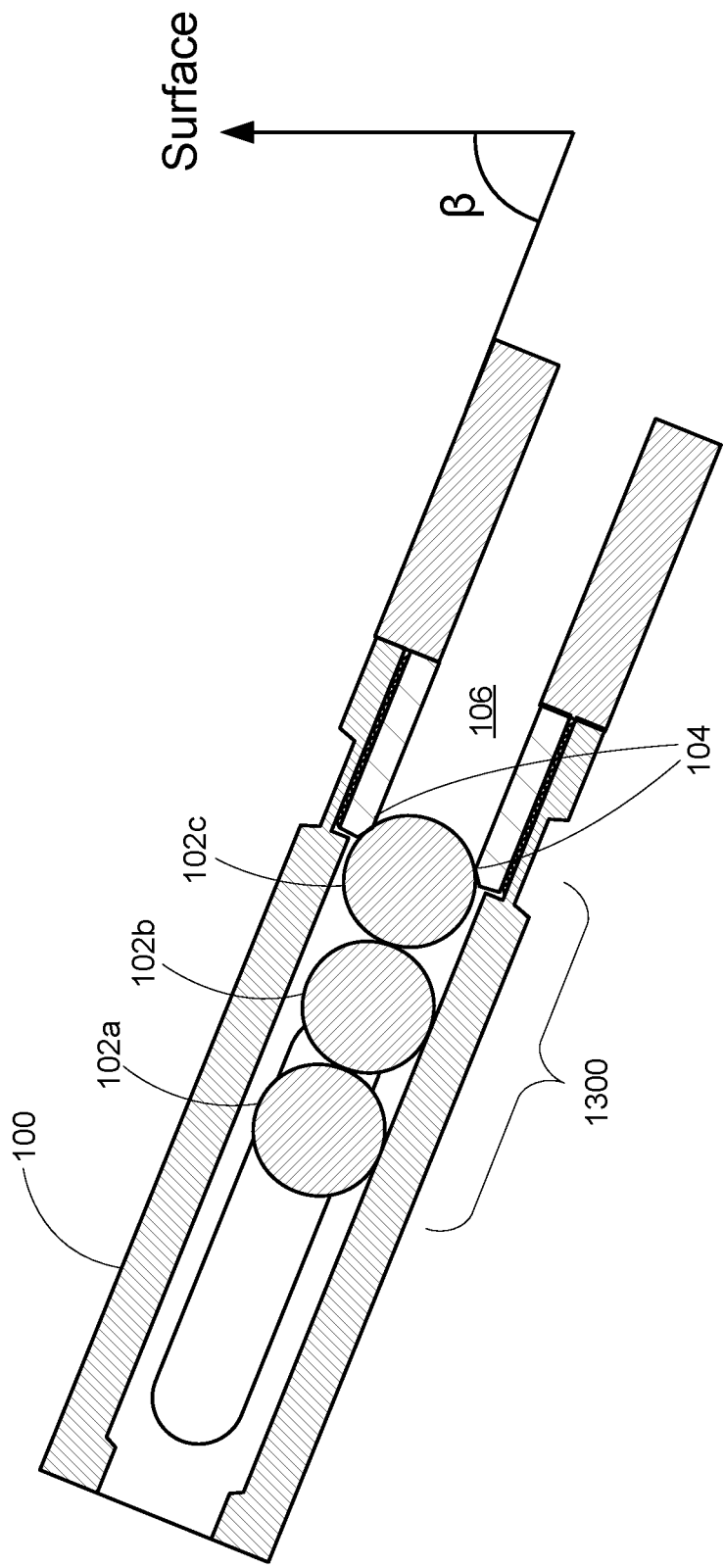
FIG. 21 shows a schematic of the bottom hole spring assembly having the flow stopper of FIG. 13 in the first position sealed against the seat to restrict fluid flow according an exemplary embodiment.

FIG. 21 shows a schematic of the bottom hole spring assembly 100 having the flow stopper 1300 of FIG. 13 in the first position sealed against the seat 104 to restrict fluid flow according an exemplary embodiment. In some embodiments, the additional mass and length provided by three balls 102a,b,c allows the standing valve configured with three balls 102a,b,c to provide the seal up to a bottom hole spring assembly 100 angle β of approximately 66 degrees. Three balls 102a,b,c generally receive the same benefits as two balls 102a,b but achieve higher angles β due to the additional mass of the third ball 102c.

Figure 22:
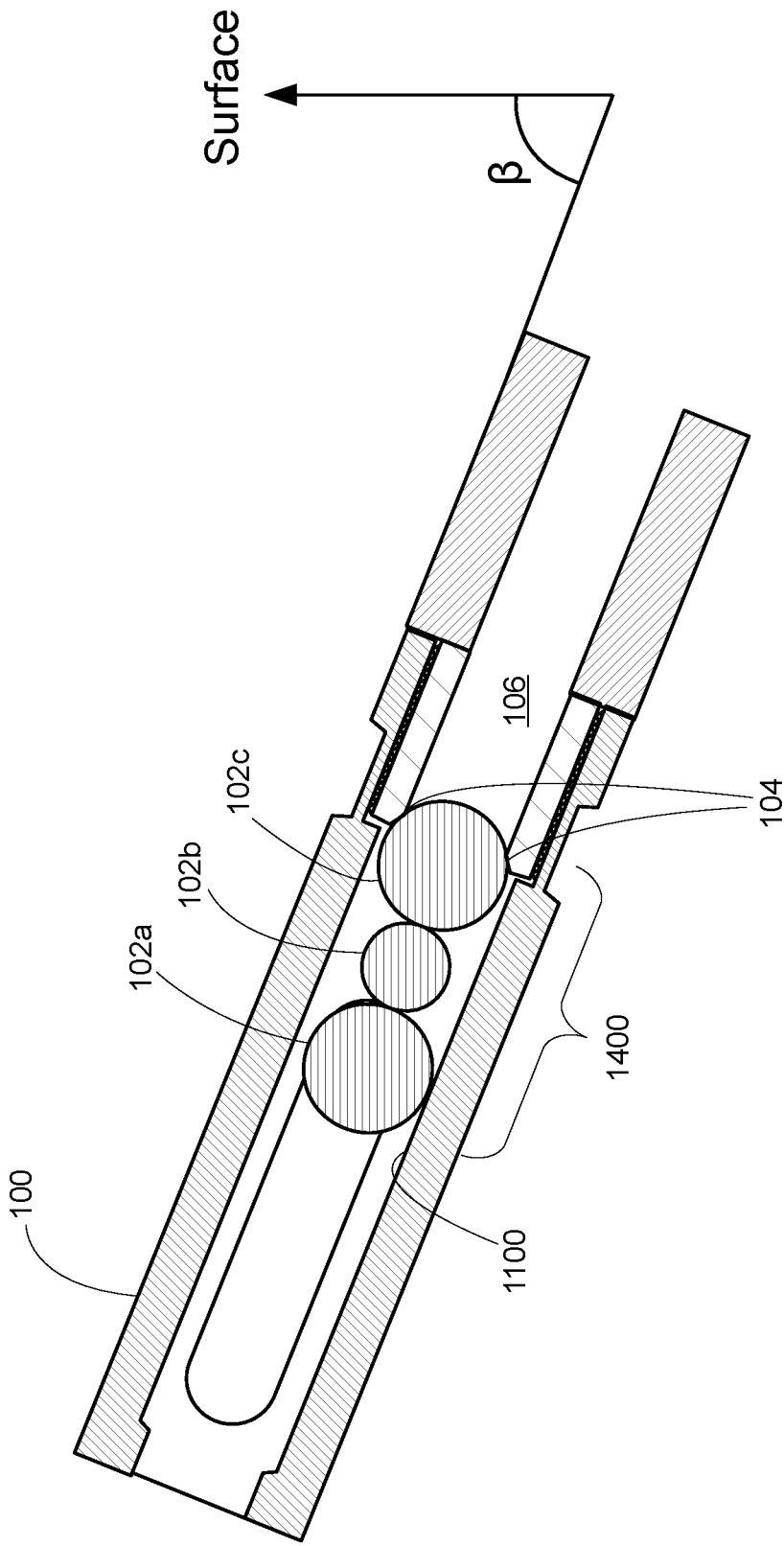
FIG. 22 shows a schematic of the bottom hole spring assembly having the flow stopper of FIG. 14 in the first position sealed against the seat to restrict fluid flow according an exemplary embodiment.

FIG. 22 shows a schematic of the bottom hole spring assembly 100 having the flow stopper 1400 of FIG. 14 in the first position sealed against the seat 104 to restrict fluid flow according an exemplary embodiment. Since the second ball 102b has a smaller diameter, the second ball 102b does not contact the housing 1100 reducing the contact area and therefore reducing friction between the flow stopper 1400 and the housing 1100.

Figure 23:
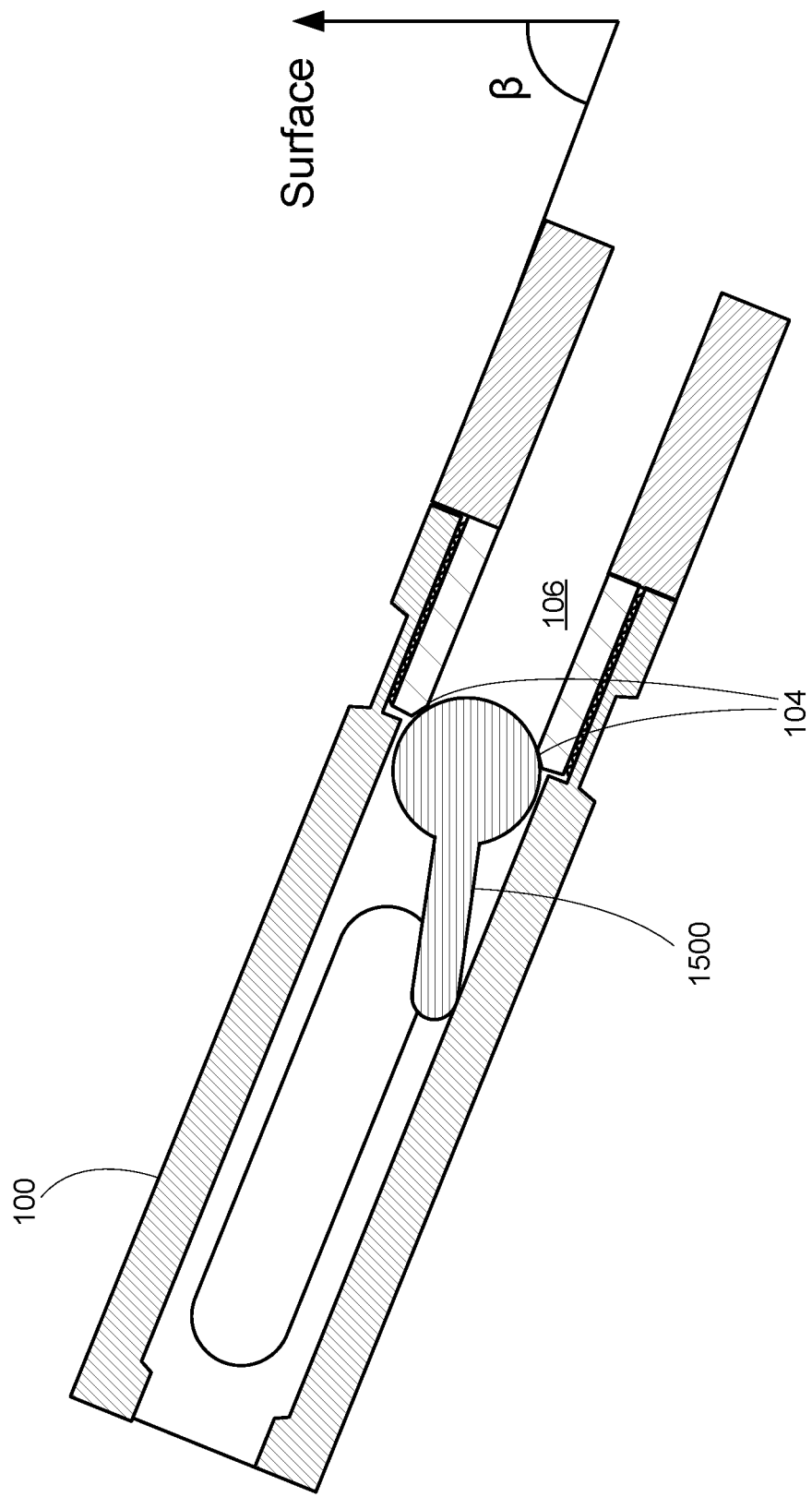
FIG. 23 shows a schematic of the bottom hole spring assembly having the flow stopper of FIG. 15 in the first position sealed against the seat to restrict fluid flow according an exemplary embodiment.

FIG. 23 shows a schematic of the bottom hole spring assembly 100 having the flow stopper 1500 of FIG. 15 in the first position sealed against the seat 104 to restrict fluid flow according an exemplary embodiment.

Figure 24:
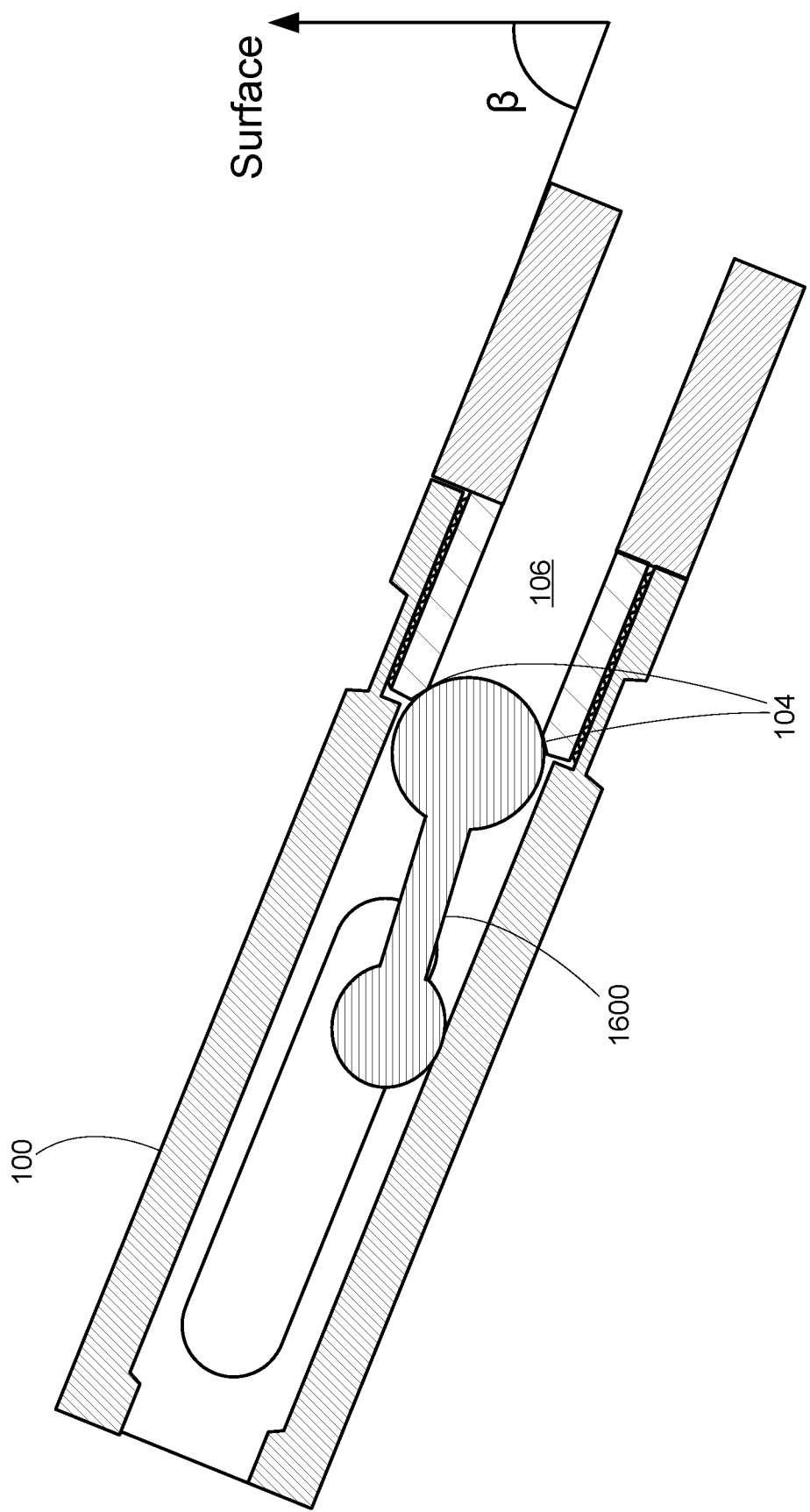
FIG. 24 shows a schematic of the bottom hole spring assembly having the flow stopper of FIG. 16 in the first position sealed against the seat to restrict fluid flow according an exemplary embodiment.

FIG. 24 shows a schematic of the bottom hole spring assembly 100 having the flow stopper 1600 of FIG. 16 in the first position sealed against the seat 104 to restrict fluid flow according an exemplary embodiment.

Figure 25:
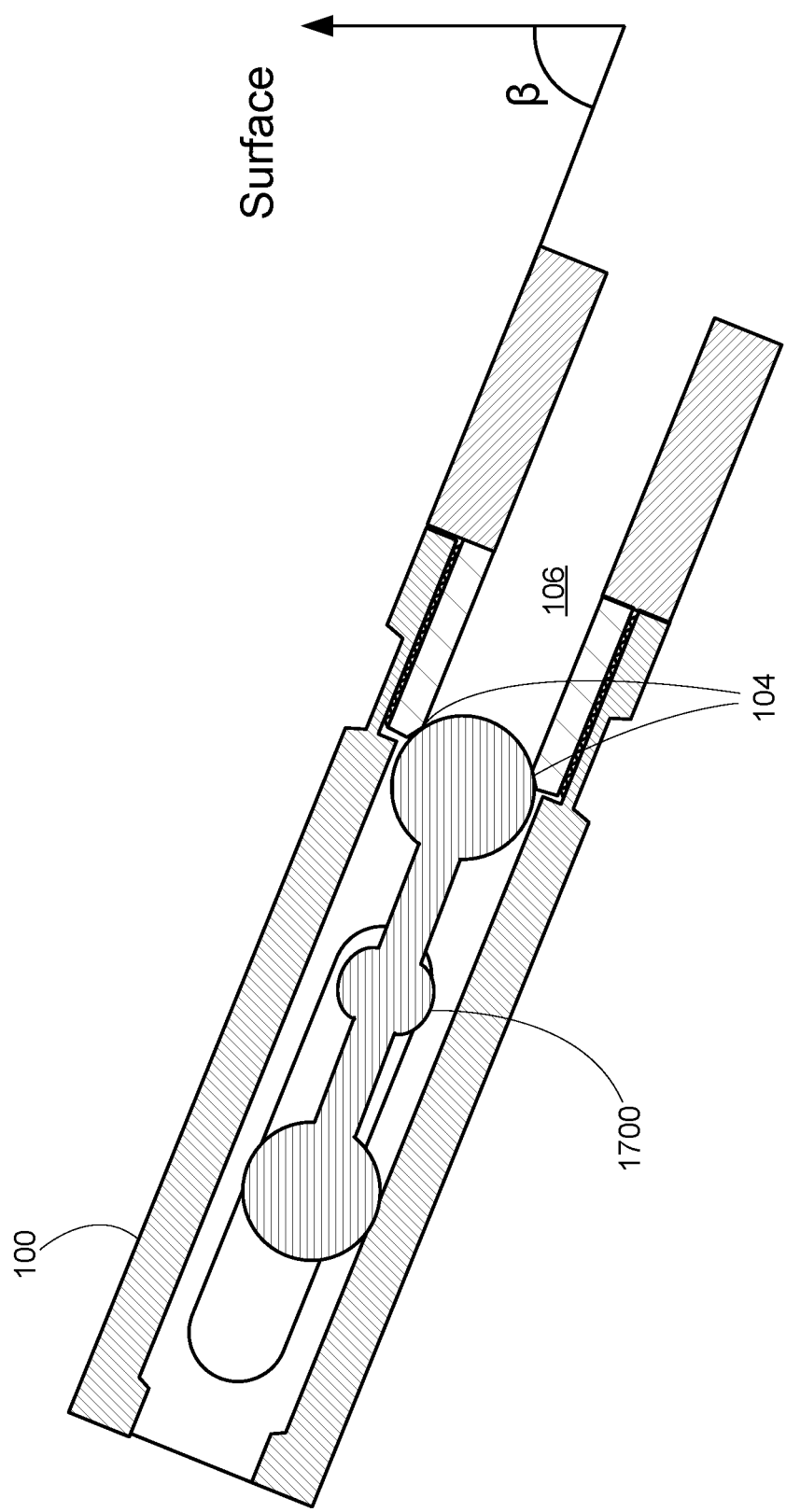
FIG. 25 shows a schematic of the bottom hole spring assembly having the flow stopper of FIG. 17 in the first position sealed against the seat to restrict fluid flow according to an exemplary embodiment.

FIG. 25 shows a schematic of the bottom hole spring assembly having the flow stopper 1700 of FIG. 17 in the first position sealed against the seat 104 to restrict fluid flow according to an exemplary embodiment.

TABLE 1

Flow stopper configuration and the corresponding angle of effectiveness in some embodiments with respect to the vertical orientation

| Flow Stopper Configuration | Angle of effectiveness (degrees) |
| --- | --- |
| One ball | 48 |
| Two balls | 57 |
| Three balls | 66 |
| Barbell shape | 76 |

According to an exemplary embodiment there is a flow stopper 400 for a standing valve within a bottom hole spring assembly 100 for facilitating production of hydrocarbons. The flow stopper 400 has an elongated shape. The elongated shape 400 has a concave section 508 such that the flow stopper 400 can impact a line 500 running along an inner surface of the housing 1100 in a lengthwise direction of the tubular cavity 406. The concave section 508 allows the flow stopper 400 to impact the housing 1100 with a first point of contact 502 and a second point of contact 504 on the line 500, and the two points of contact 502, 504 are separated by a gap 506 where the flow stopper 400 does not contact the housing 1100. The flow stopper 400 may include a first and a second ball 402a,b where the balls 402a,b are connected by a stem 404. The flow stopper 1200 may include a plurality of balls 102a,b that are not connected to each other. The flow stopper 1500 may include a ball 1502 connected to a stem 1504.

Although the invention has been described in connection with preferred embodiments, it should be understood that various modifications, additions and alterations may be made to the invention by one skilled in the art without departing from the spirit and scope of the invention.

For instance, in some embodiments it is desirable to not have a perfect seal between the flow stopper and the seat to permit the fluid to flow back into the formation which reduces the likelihood of needing a wireline truck to pull the plunger. In this way, the flow stopper balls or ends may have notches carved therein to provide for some limited fluid flow even while the flow stopper is against the seat.

Use of the balls and rounded bulges similar to balls on ends of the elongated flow stopper reduces a contact area between the flow stopper and the housing as balls typically have smaller contact area within a tubular cavity in comparison to cylinders, ellipsoids, ovoid, etc. As the contact area is reduced, the friction between the housing and the flow stopper is also reduced making it easier for the flow stopper to slide within the housing. That said, it is possible to use other shapes on the ends of the elongated flow stopper such triangular prisms and shapes, rectangular shapes, pyramid shapes, etc.; however, the subterranean well environment tends to be abrasive with sand and such non-rounded shapes may experience uneven wear and tear at the edges and the ability of the flow stopper to provide the seal may be impacted. In some embodiments, the first ball and the second ball may have an ovoid shape or any other shape capable of providing a seal. Other shapes that may be utilized include a cube, a pyramid, a rectangular prism, a triangular prism, or a combination thereof, for example.

As described above, flow stoppers utilized here are particularly beneficial with a standing valve. In some embodiments, the standing valve is a pressure relief standing valve which further includes a spring.

Figure 26:
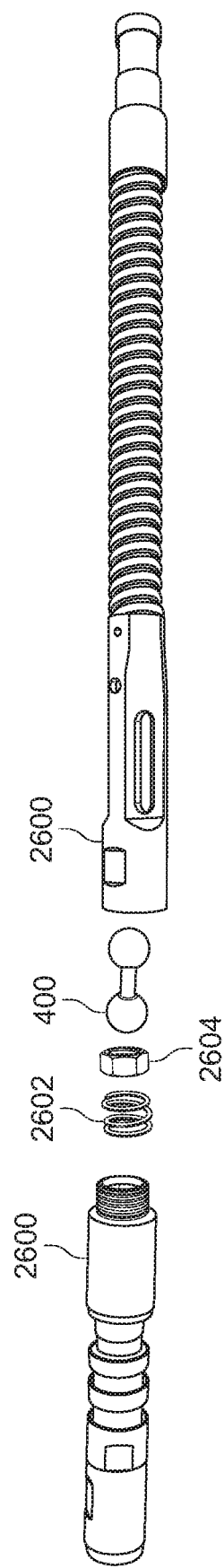
FIG. 26 shows an exploded view of the bottom hole spring assembly incorporating a pressure relief system including the flow stopper of FIG. 4 according an exemplary embodiment.
Figure 27:
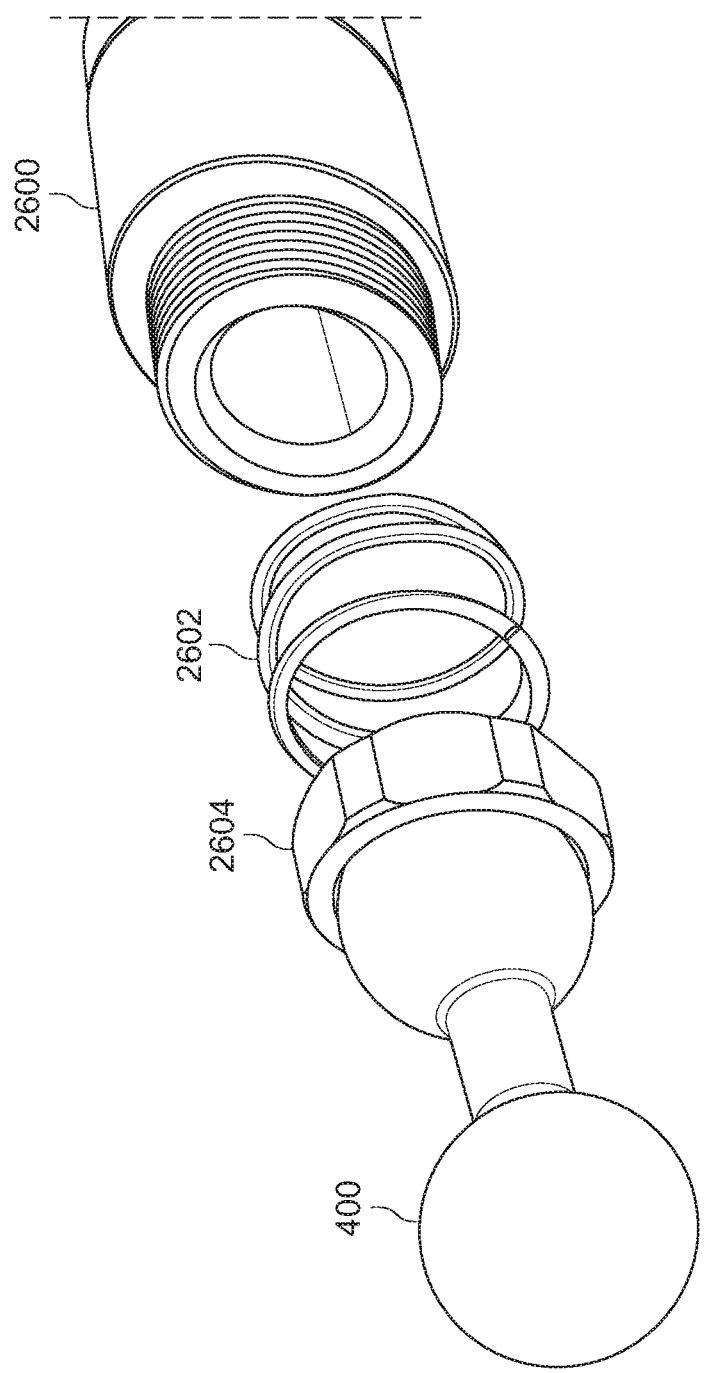
FIG. 27 shows a closeup exploded view of the bottom hole spring assembly with pressure relief system of FIG. 26.
Figure 28:
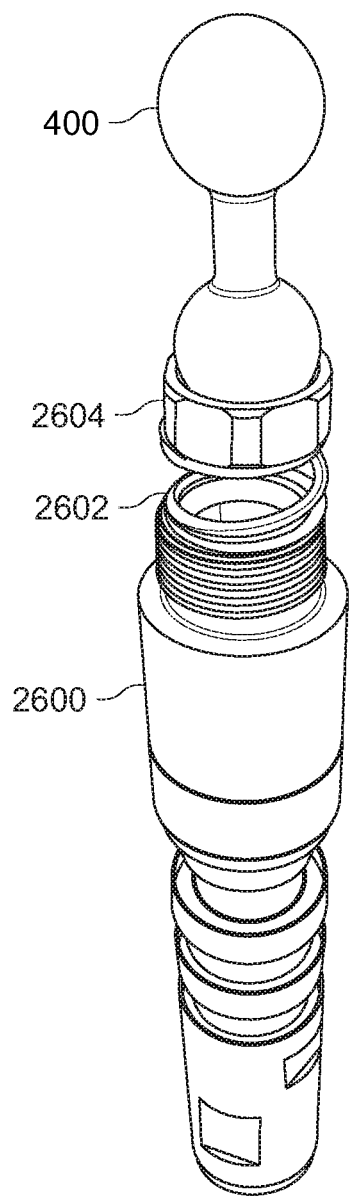
FIG. 28 shows the flow stopper of FIG. 4 in the first position sealed against the seat while the pressure relief system is opened according to an exemplary embodiment.

FIG. 26, FIG. 27, and FIG. 28 illustrate a pressure relief system 2600 that utilizes the barbell-shaped flow stopper 400 of FIG. 4 according to an exemplary embodiment. In some embodiments, the bottom hole spring assembly 100 is converted to a pressure relief system 2600 by the use of a pressure relief kit. The kit consists of a spring 2602 and seat 2604. The seat 2604 shoulders out to a lip inside the cage area where it mechanically seals. When assembled, there is slight tension on the spring 2602. The pressure relief standing valve 2600 is used to trap fluids, and it can also be used to release the fluids back to the formation. The pressure relief valve 2600 operates under a pressure differential that is activated by the weight of the fluid column coupled with an applied back pressure. Once the pressure differential is reached, the relief valve 2600 opens due to the tension on the spring 2602 to allow fluids to be recycled back into the formation and limit the need for wire line or swab rig recovery. In some embodiments, the flow stopper 400 is used with a pressure relief standing valve 2600.

Although the above description has described benefits of the elongated flow stopper with concave section to facilitate hydrocarbon production from a subterranean well, other applications including applications outside of the oil and gas industry may also benefit from having a check valve that works at angles β closer to horizontal and may therefore employ elongated flow stoppers described herein in a similar manner.

The flow stoppers described herein are made of metals such as titanium and stainless steel in some embodiments. Other examples of materials that are used to form the flow stoppers in some embodiments include Cobalt, Chrome, Carbide, Tungsten Carbide, Titanium Carbide, and any other alloy or non alloy. In yet other embodiments, the flow stopper is made from any ferrous or non-ferrous material. Tough plastic materials are also be utilized for forming the flow stopper in some embodiments.

All combinations and permutations of the above described features and embodiments may be utilized in conjunction with the invention.

What is claimed is:

1. A flow stopper for a standing valve within a bottom hole spring assembly for facilitating production of hydrocarbons from a subterranean well, the bottom hole spring assembly including a tubular cavity within a housing wherein the standing valve prevents backflow of a fluid column to allow a surface controlled plunger system to remove the fluid column, the housing having a plurality of ports providing fluid access to the tubular cavity, wherein:

the flow stopper is moveable between a first position and a second position within the tubular cavity;

the flow stopper in the first position is adjacent to a seat of a bottom port of the ports thereby obstructing fluid flow through the bottom port;

the flow stopper in the second position is away from the seat of the bottom port thereby allowing fluid to flow through the bottom port;

the flow stopper has an elongated shape; and the elongated shape has a concave section such that the flow stopper can impact a line running along an inner surface of the housing in a lengthwise direction of the tubular cavity, the concave section allowing the flow stopper to impact the housing with a first point of contact and a second point of contact on the line, the concave section ensuring that the first point of contact and the second point of contact are separated by a gap where the flow stopper does not contact the inner surface of the housing on the line.

2. The flow stopper of claim 1, comprising:
a first ball; and
a stem connecting a first end of the stem to the first ball.

3. The flow stopper of claim 2, wherein a second end of the stem is rounded.

4. The flow stopper of claim 1, comprising:
a first ball;
a second ball; and
a stem coupling the first ball to the second ball.

5. The flow stopper of claim 4, wherein a thickness of the stem is smaller than a diameter of the first ball.

6. The flow stopper of claim 5, wherein the thickness of the stem is smaller than a diameter of the second ball.

7. The flow stopper of claim 4, wherein diameters of the first ball and the second ball are larger than a width of slots in the housing of the bottom hole spring assembly.

8. The flow stopper of claim 1, comprising a plurality of balls.

9. The flow stopper of claim 8, wherein the balls are not mechanically connected to each other and are therefore free to separately move within the tubular cavity.

10. The flow stopper of claim 8, wherein a diameter of a first ball is different from a diameter of a second ball.

11. The flow stopper of claim 8, wherein the balls are connected by one or more stems.

12. The flow stopper of claim 1, wherein the flow stopper comprises a plurality of stopper parts that are mechanically connected to each other so that the flow stopper parts move together within the tubular cavity.

13. The flow stopper of claim 1, wherein the flow stopper comprises a plurality of stopper parts that are not mechanically connected to each other and are therefore free to separately move within the tubular cavity.

14. The flow stopper of claim 1, wherein the flow stopper is fabricated from stainless steel.

15. The flow stopper of claim 1, wherein the flow stopper is fabricated from titanium.

16. A bottom hole spring assembly for facilitating production of hydrocarbons from a subterranean well, the bottom hole spring assembly comprising:
a housing having a plurality of ports providing fluid access to a tubular cavity within the housing; and
a standing valve comprising a seat and a flow stopper, the standing valve prevents backflow of a fluid column to allow a surface controlled plunger system to remove the fluid column;
wherein the flow stopper is moveable between a first position and a second position within the tubular cavity;
the flow stopper in the first position is adjacent to the seat of a bottom port of the ports thereby obstructing fluid flow through the bottom port;
the flow stopper in the second position is away from the seat of the bottom port thereby allowing fluid to flow through the bottom port;
the flow stopper has an elongated shape; and
the elongated shape has a concave section such that the flow stopper can impact a line running along an inner surface of the housing in a lengthwise direction of the tubular cavity, the concave section allowing the flow stopper to impact the housing with a first point of contact and a second point of contact on the line, the concave section ensuring that the first point of contact and the second point of contact are separated by a gap where the flow stopper does not contact the inner surface of the housing on the line.

17. The bottom hole spring assembly of claim 16, wherein the flow stopper includes a first ball and a stem connecting a first end of the stem to the first ball.

18. The bottom hole spring assembly of claim 16, wherein:
the flow stopper includes a first ball, a second ball, and a stem connecting the first ball to the second ball;
a diameter of the first ball is substantially equal to a diameter of the second ball; and
the stem has a cylindrical shape which has a diameter less than diameters of the first ball and the second ball.

19. The bottom hole spring assembly of claim 16, wherein the flow stopper comprises a plurality of stopper parts that are not mechanically connected to each other and are therefore free to separately move within the tubular cavity.

20. The bottom hole spring assembly of claim 19, wherein the plurality of stopper parts comprises a plurality of balls.

* * * * *